United States Patent [19]

Prengaman et al.

[11] Patent Number: 5,172,850
[45] Date of Patent: Dec. 22, 1992

[54] ELECTROWINNING ANODE AND METHOD OF MANUFACTURE

[75] Inventors: Raymond D. Prengaman, Arlington; Clifford E. Morgan, Grand Prairie, both of Tex.

[73] Assignee: RSR Corporation, Dallas, Tex.

[21] Appl. No.: 751,523

[22] Filed: Aug. 29, 1991

[51] Int. Cl.⁵ .................. B23K 31/02; B23K 101/38
[52] U.S. Cl. .................................. 228/176; 228/199; 228/214; 29/460
[58] Field of Search .............. 228/176, 199, 214; 29/460, 885; 204/286

[56] References Cited

U.S. PATENT DOCUMENTS

| | | | |
|---|---|---|---|
| 4,135,013 | 1/1979 | Yamaguchi et al. | 228/199 |
| 4,373,654 | 2/1983 | Prengaman et al. | 228/179 |
| 4,623,087 | 11/1986 | Conolly | 228/176 |

Primary Examiner—Richard K. Seidel
Assistant Examiner—Jeffrey T. Knapp
Attorney, Agent, or Firm—Theresa M. Gillis

[57] ABSTRACT

An electrowinning anode is formed by tightly joining a sheet of lead anode material to a copper busbar using solder to fill the joint. The busbar is optimally coated with a tin alloy by dipping the busbar into the alloy prior to being joined with the sheet. A lead coating is electrodeposited onto the busbar and the soldered joint to provide a complete metallurgical seal and good resistance to acid corrosion.

2 Claims, 2 Drawing Sheets

ELECTROWINNING ANODE AND METHOD OF MANUFACTURE

BACKGROUND OF THE INVENTION a) Field of the Invention

This invention relates to an improved electrowinning anode. The anode is a lead alloy sheet soldered to a copper busbar with a layer of lead electroplated over the busbar and the joint between the busbar and anode sheet.

b) State of the Art

Lead alloys have been used for many years as electrowinning anodes for recovery of copper, nickel and zinc from sulfate solutions. In most anodes the lead anode plate 1 is joined to the copper busbar 2 by casting lead 3 around the busbar as shown in FIG. 1. The lead cast around the busbar may be the same composition as the anode sheet, or a second alloy may be attached to the lead cast around the bar by welding or burning the sheet to the lead cast around the bar. The lead cast around the busbar serves as a barrier to attack of the busbar by acid mist produced in the electrowinning process. The lead covering also serves to conduct current from the copper busbar to the anode sheet.

A new method was developed to join a lead alloy sheet to a copper busbar in U.S. Pat. No. 4,373,654. In this system, shown in FIG. 2, a rolled lead-calcium-tin alloy sheet 4 is joined to the copper busbar 5 by means of a solder joint 6 in slot 7 of the busbar. This method gives a complete metallurgical bond between sheet and bar unlike that attained in the cast around system. In this system a thin coating 8 of lead tin alloy is formed on the surface of the copper busbar by dipping prior to the soldering process.

This thin coating produced by dipping in U.S. Pat. No. 4,373,654 is often not sufficient to completely protect the copper busbar from large amounts of acid mist or direct impingement of electrolyte onto the dip coated bar. Some attack of the copper bar can occur. The finished anode produced by this method cannot be coated with additional lead by dipping or casting around the bar because the lead or lead alloy used has a higher melting point than the solder in the joint, thus some remelting of the solder joint and loss of quality in the joint can occur.

The present invention provides a new method for completely protecting the copper busbar when producing anodes in which an anode sheet is soldered to a busbar by, for example, the method of U.S. Pat. No. 4,373,654.

SUMMARY OF THE INVENTION

The present invention provides an improved electrowinning anode of the type having a lead anode sheet soldered to a copper busbar. The improvement comprises electrodepositing a coating of lead onto the surface of the busbar and over the joint between the busbar and the anode sheet to provide a complete metallurgical seal around the busbar and the joint. The anodes are formed by immersing the busbar and the joint into an electroplating bath containing a dissolved lead salt and subjecting the bath and anode to conditions causing lead to electrodeposit onto the busbar and the joint until a complete metallurgical seal is formed around the busbar and joint.

DETAILED DESCRIPTION OF THE INVENTION

Figure 1:
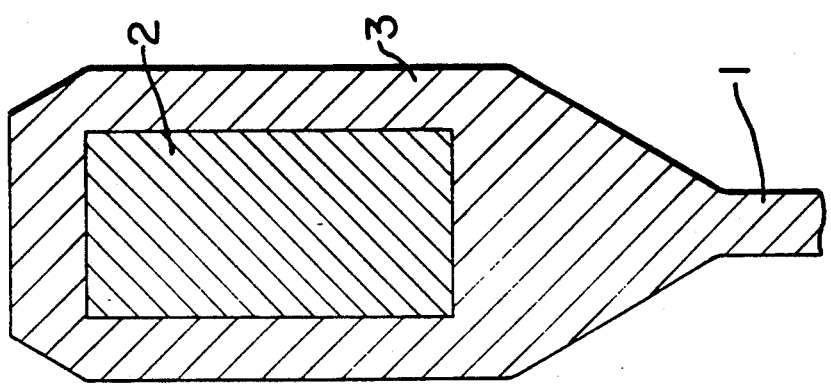
FIG. 1 is a cross-sectional view of a conventional cast lead anode.
Figure 2:
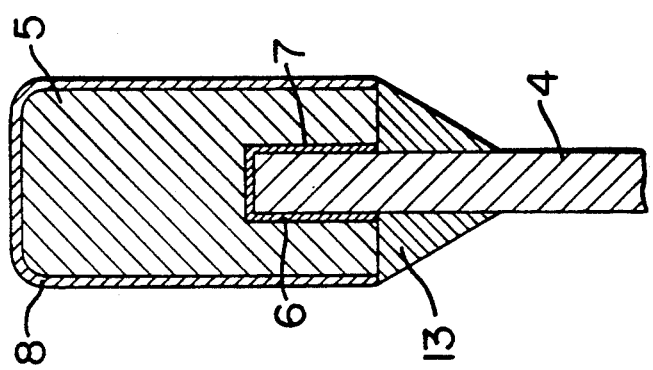
FIG. 2 is a cross-sectional view of an anode of the type described in U.S. Pat. No. 4,373,654.
Figure 4:
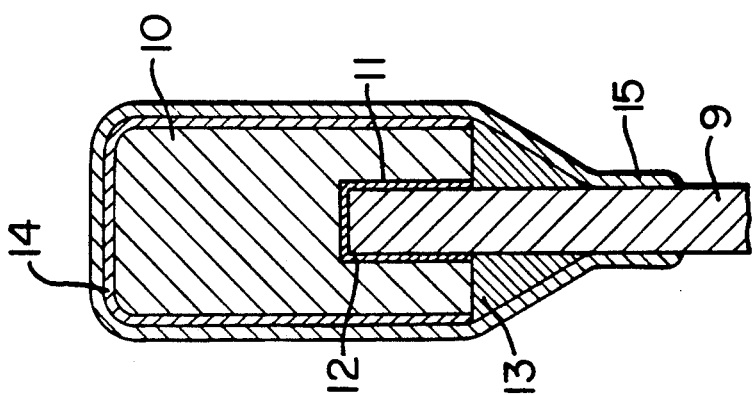
FIG. 4 is a sectional view of the anode shown in FIG. 3.
Figure 3:
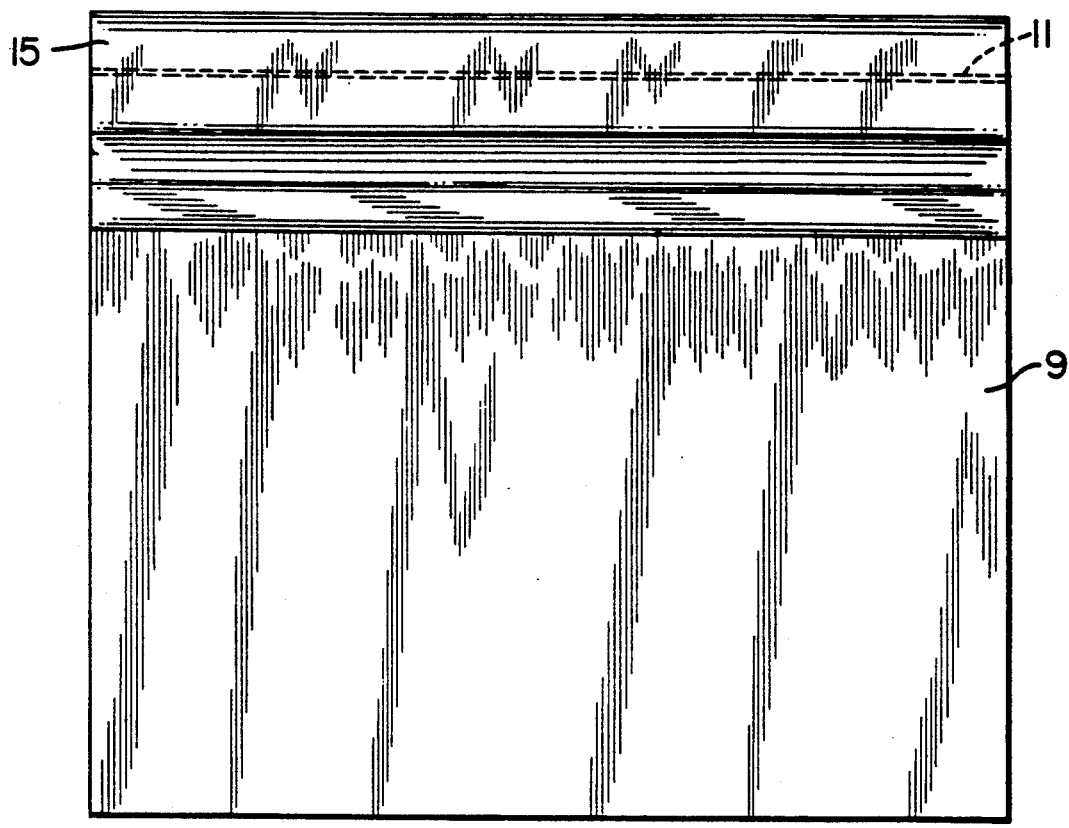
FIG. 3 is a side view of the portion of the anode of FIG. 2 where the lead sheet is joined to the busbar, modified in accordance with the present invention.

In the practice of the present invention, a lead anode sheet 9 is joined to a copper busbar 10 in a manner which permits good conductivity between the busbar and the lead sheet. The busbar is coated with lead by means of electrodeposition, thus forming an anode which is substantially corrosion resistant.

In accordance with the invention, lead alloy anode material used in electrowinning is formed as a sheet. The lead sheet material employed in the anodes of the invention may be any lead alloy suitable for use in electrowinning. Such alloys include lead-silver, lead-calcium-silver, lead-antimony, lead-antimony-arsenic, lead calcium, lead-strontium-tin, lead-strontium-tin-aluminum, lead-calcium-strontium-tin and lead-calcium-tin alloys. The sheet may be formed by casting, extruding or rolling the alloy material. References to lead anode material herein are intended to include all lead alloys, however formed, which are suitable as anode material in electrowinning from sulfuric acid electrolytes.

An example of a lead sheet material of choice for use in the present invention is wrought lead-calcium-tin alloy. This alloy should contain between 0.03% and 0.08% calcium and sufficient tin to produce at least a 0.11/1 calcium/tin weight percent ratio for optimum performance. The tin should additionally be limited to a maximum of about 2 weight percent for maximum mechanical properties. Maximizing the tin and/or calcium contents within the above limits increases the mechanical properties of the anode. An additional alloy of choice is wrought lead-calcium-silver alloys. This alloy should contain between 0.03 and 0.10% calcium and 0.3% or more silver.

Such lead-calcium-tin or lead-calcium-silver alloys are preferably formed into sheets by hot working. Such hot working may be effected by deforming a cast billet hot, preferably at temperatures above 150° C., to reduce or prevent the amount of precipitation of calcium during the working. By keeping the calcium in solution, the material can be worked extensively from large billets while the material is soft and plastic. The deformation to final gauge may be done hot or cold, depending on the desired properties and grain structure. The hotter the deformation, the lower are the final mechanical properties and the higher the elongation. Hot deformation, however, produces fewer stresses which might cause warping than cold working.

The copper busbar may be dipped wholly or partially into an alloy of tin to produce a substrate for electrodeposition. For example, a lead alloy containing a sufficient amount of additional tin component which bonds to the copper bar will be an effective coating material. A preferred coating material is a lead-tin-antimony alloy containing at least 50% lead.

The anode sheet 9 may be joined to a busbar 10 as taught in U.S. Pat. No. 4,373,654, the disclosures of which are incorporated herein by reference. However, any joinder means which does not require widening the anode to any significant extent beyond the width of the busbar and which permits good conductivity between the lead sheet and the busbar may be used.

In preferred practice, the busbar has a longitudinal slot 11 into which the lead sheet fits snugly. The bar and the lead sheet are joined together preferably by means of a solder material 12. The solder is preferably a material containing tin and another material and having sufficient fluidity to allow penetration into the slot and bonding between the copper bar and the lead alloy sheet. Such penetration and bonding maximizes the contact between the bar and anode sheet, thus optimizing conductivity. Optimally, the lead anode sheet is then burned to the copper bar at all joints to produce a uniform, smooth transition between the bar and sheet. The final burning operation is performed by puddling a filler alloy 13 into all crevices. The filler alloy should bond to the solder, to the copper bar or bar coating alloy and to the anode sheet. It should be of high lead content to give maximum corrosion protection to the joint areas and be fluid enough to fill all crevices and create a smooth transition joint between bar and sheet. Preferred filler alloys are: the bar coating alloy, a lead-antimony alloy, as for example lead-6% antimony alloy, a lead-low tin solder and lead-copper alloy.

In the practice of the present invention, a coating of lead 15 is electrodeposited onto the outside surface of the coated busbar and over the joint. The coating need only be thick enough to ensure complete coverage of the bar and the joint with a corrosion resistant layer.

Electrodeposition may be effected by simply inverting the joined anode sheet and busbar and immersing the anode into an electroplating solution until the busbar and the joint are completely covered by the solution. The anode is then electrically connected in a manner such that the anode functions as a cathode. The anode used in the electroplating process is any suitable lead material from which lead can be dissolved and deposited on the copper busbar "cathode." Pure lead anodes are preferred, but various lead alloys may also be used. A suitable current is then applied for a period of time sufficient to produce the desired coating.

The bath may consist of a solution of lead fluoborate, lead sulfamate, lead fluorosilicate, or other plating bath from which lead can be electrodeposited on the surface of the busbar. In this process, metal is dissolved from a pure lead or lead alloy anode and electrodeposited onto the coated copper busbar producing a complete metallurgical seal around the busbar by the electrodeposited coating. The thickness of the electrodeposited layer may vary from 0.001" (0.025 mm) to 0.160" (4 mm). The normal range is 0.020" (0.5 mm) to 0.080" (2 mm).

The following example is illustrative of the invention.

EXAMPLE

Anodes were produced by slotting the copper busbar, coating by dipping with a thin (0.002–0.005") layer of Pb-15% tin-1% antimony alloy. A rolled lead-calcium-tin alloy sheet was joined to the coated bar by filling the slot with a lead-60% tin alloy and placing the rolled sheet into the slot in the bar. The joint was sealed with lead-6% Sb filler metal. Finished anodes were inverted and immersed in a bath containing 300 g/l lead fluoborate, 35 g/l fluoboric acid, 10 g/l boric acid, and 0.018 g/l animal bone glue such that the complete copper busbar and some of the rolled lead calcium-tin-alloy sheet was immersed in the electrolyte. The electrical connection was made in such a manner as to make the anode a cathode. Pure lead was used as the anode material. A current of approximately 200 a/m$^2$ was applied for 16 hours resulting in the deposition of about 0.028" (0.77 mm) of lead coating to the bar which tapered to about 0.003" at the very end of the copper busbar.

The performance of anodes having the electroplated lead coating on the copper busbar was compared with normal anodes having only the coating produced by dipping the busbar into the lead—15% tin 1% antimony alloy. The tests were conducted in a copper electrowinning cell at a current density of 280–300 A/m$^2$ with the busbar located about 2" above the surface of the electrolyte. The high current density produces a very high concentration of acid mist which contacts the busbar of the anode. The conventional dipped coating of the bar was removed in approximately one month under the severe acid attack and some corrosion of the copper bar occurred. The same anodes containing the electrodeposited lead of this invention suffered no loss of the electrodeposited lead layer and no attack of the copper busbar after 7 months of operation.

We claim:

1. A method of making an electrowinning anode comprising:
   (a) forming a sheet of lead alloy anode material;
   (b) forming a copper busbar with a longitudinal slot of a size such that an end of the lead alloy sheet fits tightly therein;
   (c) fitting said end of the lead sheet into said slot of the busbar;
   (d) soldering the busbar and lead sheet together;
   (e) immersing the busbar and the soldered joint with the lead sheet into a lead electroplating bath; and
   (f) electrodepositing a coating of lead onto the busbar and joint, whereby a complete metallurgical seal is formed around the busbar and soldered joint.

2. The method of claim 1 wherein the busbar is at least partially coated with a tin alloy before being fitted into the slot of the busbar.

* * * * *